E. C. SUGGS.
LOCKING DEVICE FOR VEHICLES.
APPLICATION FILED JUNE 27, 1917.
1,248,200.
Patented Nov. 27, 1917.
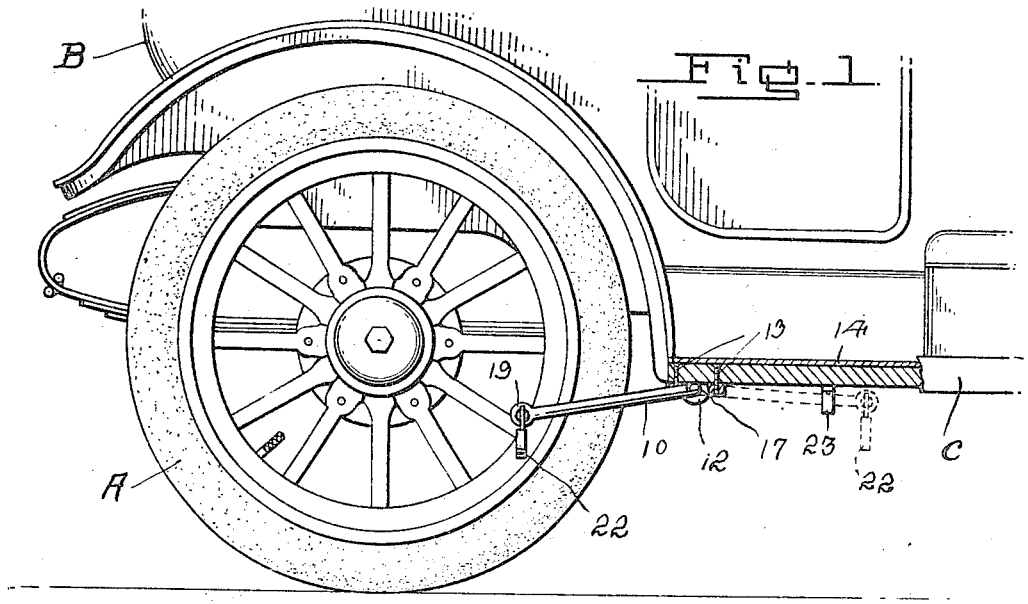
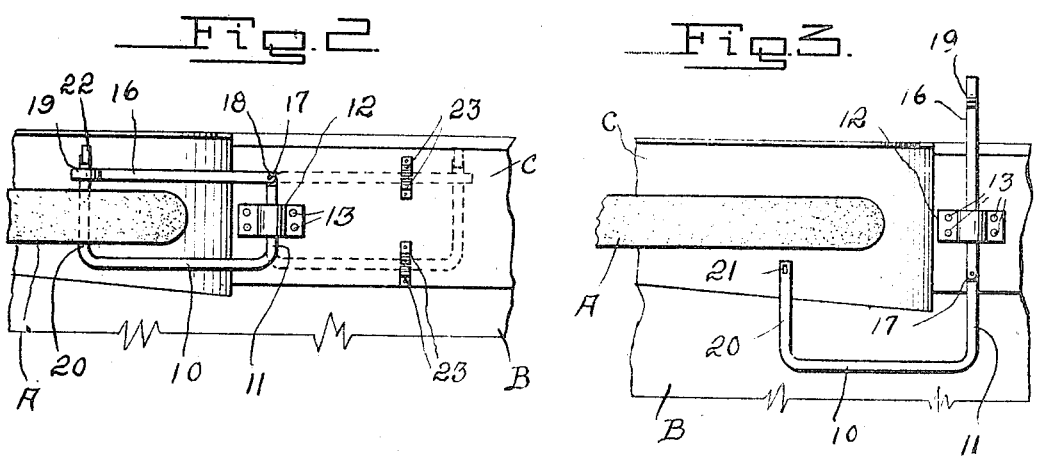
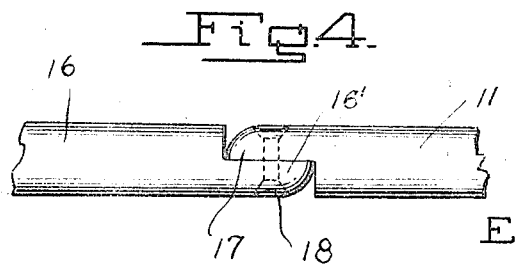
Inventor
Everett C. Suggs
By Lancaster and Allwine
his Attorneys

UNITED STATES PATENT OFFICE.

EVERETT C. SUGGS, OF PUEBLO, COLORADO.

LOCKING DEVICE FOR VEHICLES.

1,248,200.  Specification of Letters Patent.  Patented Nov. 27, 1917.

Application filed June 27, 1917. Serial No. 177,379.

*To all whom it may concern:*

Be it known that I, EVERETT C. SUGGS, a citizen of the United States, and a resident of Pueblo, in the county of Pueblo and State of Colorado, have invented a certain new and useful Improvement in Locking Devices for Vehicles, of which the following is a specification.

This invention relates to an improved lock for the ground wheel of an automobile or other vehicle.

The principal objects of the invention are to provide a simple and efficient device capable of locking one of the ground wheels of a motor vehicle so that the latter can not be moved to any material extent, even though the engine be active or inert; to provide a device of the character referred to which may be swung into operative relation to a wheel of a vehicle for locking the same against rotation, or swung into a compact position under the step when its use is not desired; and, to provide a locking device which can not be misplaced or stolen when not in operative position.

Other objects and advantages of this invention, as well as the above, will be pointed out more clearly in the following detailed description of the present preferred embodiment of this invention, the same being disclosed in the accompanying drawing, wherein:

Figure 1 is a view in side elevation showing a portion of an automobile with my device applied thereto.

Fig. 2 is a bottom plan view showing the device in locked position.

Fig. 3 is a similar view showing the parts in one position of operation.

Fig. 4 is an enlarged view of the connecting joint.

Referring to the drawing, A designates the rear wheel of an automobile B having the usual step C.

In a practical embodiment of my invention, it comprises a U-shaped yoke 10, one arm 11 of which acts as a center, upon which the same is swung into and out of locked engagement with the said wheel, and is attached to the underside of the step C by means of the strap 12. Said strap may be secured to the step by means of screws 13, the heads of the same being concealed by the step covering 14, said yoke also being free within the strap to be moved laterally during operation of the same.

A hasp 16, having a reduced end 16', is pivotally connected to the reduced end of arm 11 of the yoke as at 17 by means of a countersunk rivet 18 so as to allow passage of the joint 17 within the strap when the hasp 16 is moved into a coaxial alinement with the arm 11 of the yoke, and slid back into the strap. Adjacent the free end of the hasp is an eye 19 to be swung over the extension of the arm 20 of the yoke, said extension being provided with a perforation 21 to receive the bail of a padlock 22.

Spring clips 23 are fastened to the underside of the step C and positioned so that when the device is swung out of operation, the base bar of the yoke, and the hasp, are engaged by the said spring clips, thereby, the lock is held in a compact position under said step. The spring clips, by being so positioned, prevent the rattle of the several parts of the device.

In operation, to lock the vehicle, the device is first withdrawn from the clips 23, the padlock is then removed from the perforation 21, which removal allows the hasp 16 to be swung into a coaxial alinement with the arm 11 of the yoke, as shown in Fig. 3. The arm and hasp are then slid inwardly within the strap a sufficient distance to allow arm 20 to clear the wheel A when swung to a position opposite to the opening of the adjacent spokes in the wheel. The device is then drawn out of its original position, the arm 20 extending between the said adjacent spokes, the hasp swung over the extension of the arm 20, and the padlock applied within the perforation 21.

The padlock performs no function when the device is in a compact position under the step C, and may be left off at the option of the operator of the vehicle, as the spring clips are so arranged that the yoke and hasp are held securely together.

It is of course understood that the parts of this device as above specifically described, may be changed as to dimensions and form to suit the various makes of motor vehicles, without departing from the spirit of the invention, such changes and modifications being restricted only by the scope of the following claims.

I claim:

1. A locking apparatus for vehicles comprising in combination, a yoke, a hasp having pivotal connection with one of the arms of said yoke, and a bearing for the said arm of said yoke with which said hasp has connection, said bearing adapted for connection to a vehicle, and the connection between said hasp and yoke capable of sliding movement through said bearing.

2. A locking apparatus for vehicles comprising in combination, a yoke, one arm of said yoke having a reduced end portion, a hasp having a reduced end portion adapted to engage the said reduced end portion of said yoke, said reduced end portions, when said arm and hasp are axially alined, of substantially the same girth as the said arm, a pivotal connection between the said reduced end portions of said yoke and hasp, and a bearing for the said arm of said yoke, said bearing adapted for connection with a vehicle.

3. A locking apparatus for vehicles comprising in combination, a yoke, one arm of said yoke circular in cross section and having a reduced end portion, a hasp circular in cross section and having a reduced end portion adapted to engage said reduced end portion of said yoke, said reduced end portions, when said arm and hasp are axially alined, of substantially the same girth as the said arm, a pivotal connection between the said reduced end portions of said yoke and hasp and the said end portion rounded from a center coincident with the axis of said pivotal connection, and a bearing for the said arm of said yoke, said bearing adapted for connection with a vehicle.

4. In a locking apparatus for vehicles, the combination with a body portion and a ground wheel of the vehicle, of a yoke with one arm pivotally and slidably connected with said body portion of the vehicle and disposing the other arm of said yoke to extend between adjacent spokes of said ground wheel, a hasp having pivotal connection with one of the arms of said yoke, the free end of said hasp adapted to engage the other arm thereof, and means for locking the free end of said hasp to said yoke.

5. In a locking apparatus for vehicles, the combination with a body portion and a ground wheel of the vehicle, of a yoke with one arm pivotally and slidably connected with said body portion of the vehicle and disposing the other arm of said yoke to extend between adjacent spokes of said ground wheel, a hasp having pivotal connection with said pivoted arm of said yoke, the free end of said hasp adapted to engage the other arm of said yoke, and means for locking the free end of said hasp to said yoke.

6. A locking apparatus for vehicles comprising in combination, a yoke, one of the arms of said yoke perforated transversely, a hasp having pivotal connection with the other of the arms of said yoke, said hasp at its free end provided with an enlarged eye adapted to be slipped over the said first mentioned arm of said yoke, and a bearing for the said arm of said yoke with which said hasp has connection, said bearing adapted for connection to a vehicle, and the connection between said hasp and yoke capable of sliding movement through said bearing.

7. In a locking apparatus for vehicles, the combination with a body portion and a ground wheel of a vehicle, of a yoke with one arm pivotally and slidably connected with said body portion of the vehicle and disposing the other arm of said yoke to extend between adjacent spokes of said ground wheel, a hasp having pivotal connection with one of the arms of said yoke, the free end of said hasp adapted to engage the other arm thereof, means for locking the free end of said hasp to said yoke, and spring clips carried by the body portion positioned to embrace said yoke and hasp when the latter are swung out of operative relation to said wheel.

8. In a locking apparatus for vehicles, the combination with a body portion and a ground wheel of a vehicle, of a yoke with one arm pivotally and slidably connected with said body portion of the vehicle and disposing the other arm of said yoke to extend between adjacent spokes of said ground wheel, a hasp having pivotal connection with one of the arms of said yoke, the free end of said hasp adapted to engage the other arm thereof, means for locking the free end of said hasp to said yoke, and spring clips carried by the body portion positioned to embrace the main body portion of said yoke and said hasp when the same are in engagement and out of operative relation to said wheel.

EVERETT C. SUGGS.